United States Patent

[11] 3,549,091

[72] Inventor Richard A. Slepetys
Bricktown, N.J.
[21] Appl. No. 713,215
[22] Filed Mar. 14, 1968
[45] Patented Dec. 22, 1970
[73] Assignee National Lead Company
New York, N.Y.
a corporation of New Jersey

[54] FLUID ENERGY MILLING TiO₂ PIGMENT
10 Claims, 2 Drawing Figs.
[52] U.S. Cl. .................................................. 241/5,
106/300, 106/308, 241/16, 241/29
[51] Int. Cl. ........................................................ B02c 19/06,
C09c 1/36
[50] Field of Search ........................................... 241/5, 16,
29, 39; 106/300, 308(N); (Inquired class 23)

[56] References Cited
UNITED STATES PATENTS
3,260,467 7/1966 Twist ............................. 241/39X 3,412,944 11/1968 Wollenberg .................. 241/5
FOREIGN PATENTS
1,022,621 3/1966 Great Britain ................ 241/5

Primary Examiner—Robert C. Riordon
Assistant Examiner—Donald G. Kelly
Attorneys—Charles F. Kaegebehn, Robert L. Lehman and Harold L. Gammons ABSTRACT: Method and means for producing titanium dioxide pigment combining both optimum pigmentary properties i.e. tinting strength, spectral characteristics, brightness, tone, etc. with optimum dispersion in coating compositions, the process being an improvement over present methods for producing TiO₂ pigments in that the TiO₂ pigmentary material is first milled at sufficiently high milling intensities to impart optimum pigmentary properties after which it is treated with a dispersing agent followed by or concurrently with a very light milling action to effect a substantially uniform coating of the dispersing agent on the individual pigment particles.

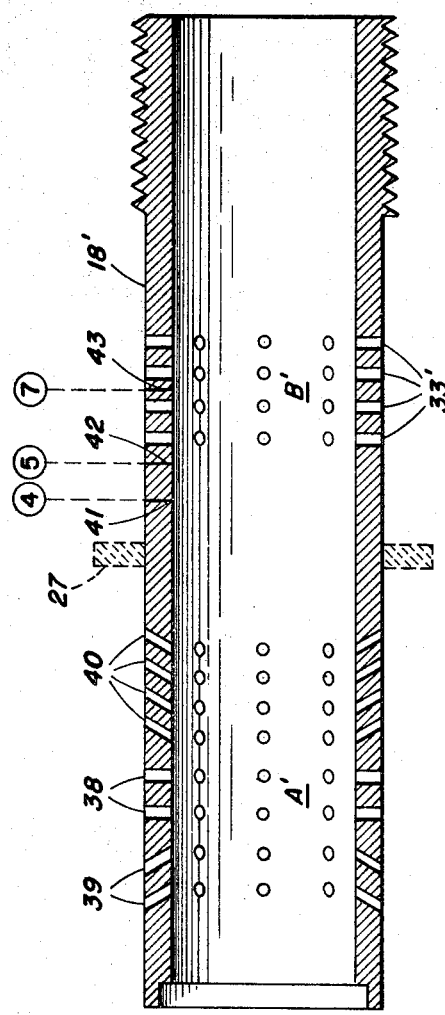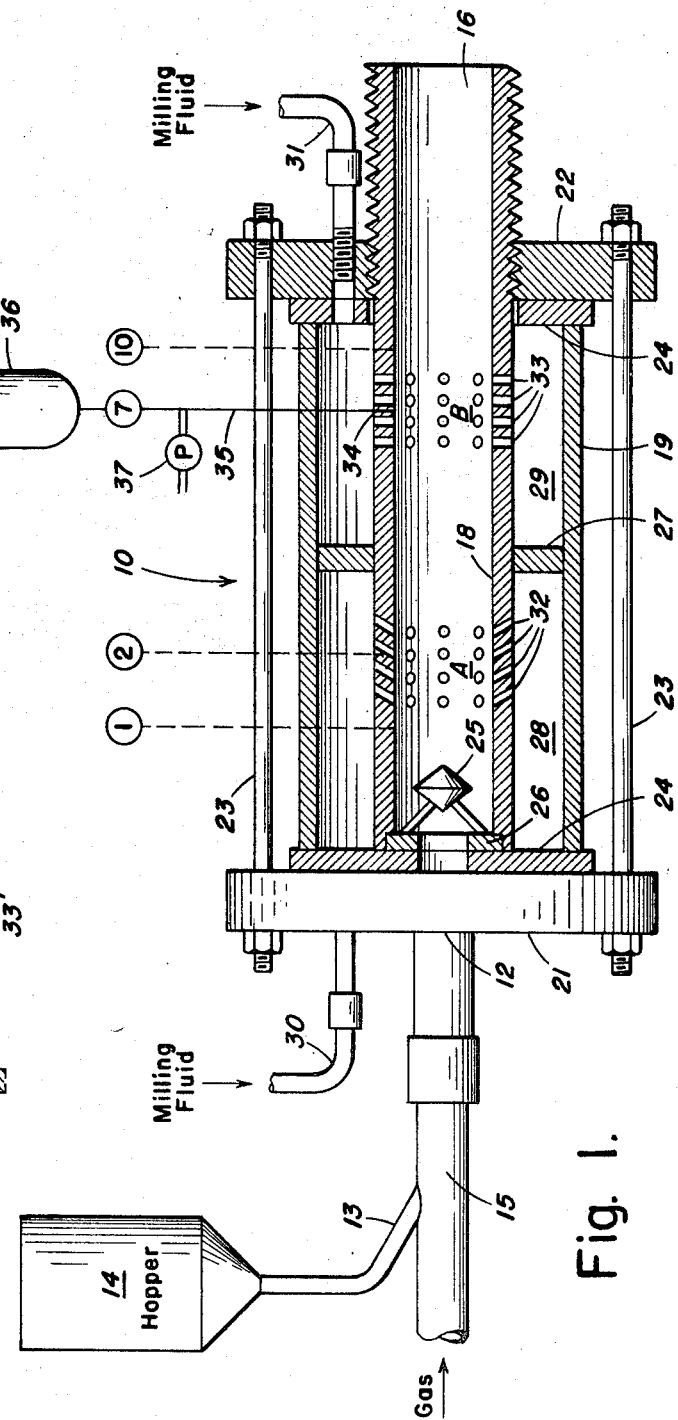

FLUID ENERGY MILLING TiO₂ PIGMENT

BACKGROUND OF THE INVENTION

Titanium dioxide pigment has for hears been produced by the so-called "sulfate process" wherein a titaniferous material such as ilmenite ore is digested in concentrated sulfuric acid to form an iron sulfate-titanium sulfate solution which is subsequently cooled to precipitate out the iron sulfate as copperas after which the titanium sulfate solution is clarified and concentrated and then heated to hydrolyze and precipitate hydrous $TiO_2$. The hydrate, in the form of water-insoluble anatase, is then calcined to produce a $TiO_2$ material sometimes referred to as calciner discharge. This calciner discharge may then be milled, hydroclassified, coated with suitable conditioning agents such as for example hydrous metal oxides of titanium, aluminum, silicon, cerium, manganese and the like and then given a relatively intense final milling to develop the optimum tinting strength, spectral characteristics and similar optical properties. These coating and milling steps are the result of extensive research over the years to produce a $TiO_2$ pigment having optimum pigmentary properties. Similar post calcination treatments are currently being used on $TiO_2$ pigmentary material produced by the vapor phase reaction of $TiCl_4$ with oxygen— sometimes referred to as chloride-base $TiO_2$ material.

Equally important as its pigmentary properties is the dispersibility of a $TiO_2$ pigment in various coating compositions and while the dispersion of a $TiO_2$ pigment in linseed oil base paints is no longer a serious problem the development of coating compositions employing alkyds, solution vinyls, latex, and thermosetting acrylics has been attended by new problems of dispersion. However some success has been achieved in this area by treating the $TiO_2$ with dispersing agents some of the most satisfactory being organic agents such as pentaerythritol, triethanolamine, polyglycols, esterified styrene maleic anhydride copolymers, polymethyl siloxane and the like. In general the dispersing agents have been applied to the $TiO_2$ material with or without a hydrous metal oxide coating, as the case may be, by adding the dispersing agent to the $TiO_2$ material prior to or simultaneously with the final milling step.

It has been found however that when a dispersant and in particular an organic dispersant is present during final milling of the $TiO_2$ pigment the organic material has a deleterious effect on the optical properties of the pigment notwithstanding some improvement of dispersion. Moreover in the light of these relatively poor results some exploratory work has been done wherein the organic material is sprayed onto the $TiO_2$ material or mechanically mixed therewith following final milling but in these instances dispersion was poor notwithstanding relatively good optical properties.

The present invention is the discovery of a new and improved method and means for producing a finished $TiO_2$ pigment combining both optimum pigmentary properties and dispersion in coating compositions and especially in alkyds, solution vinyls and acrylics.

SUMMARY OF THE INVENTION

The invention may be summarized briefly as relating to the use of a tubular fluid-energy mill and to a series of treatment steps wherein the $TiO_2$ pigmentary material, with or without a coating of one or more hydrous metal oxides, is given a final milling in the absence of a dispersing agent and with sufficient intensity to develop optimum pigmentary properties after which the milled $TiO_2$ pigment is subjected to a light milling action in the presence of a dispersing agent whereby the latter is distributed uniformly over the individual particles of $TiO_2$.

The intense milling and the light milling action each may be done in separate mills but there are definite mechanical and economical disadvantages to this as against effecting both steps in a single mill, as for example in a conventional steam micronizer or preferably in a tube mill the latter being in effect a two-stage mill, the first stage being the milling stage, the second stage effecting the light milling action used to coat the individual $TiO_2$ particles with the dispersing agent. Using the novel processing steps hereinabove described it is now possible to produce a $TiO_2$ pigment combining optimum pigmentary properties with superior dispersion in coating compositions.

DESCRIPTION OF THE DRAWINGS

FIG. 1 is a schematic elevation in section of a tubular two-stage fluid energy mill suitable for producing the superior pigment of this invention; and FIG. 2 is an enlarged elevation in section of a modification of the milling tube used in the mill of FIG. 1.

PREFERRED EMBODIMENT OF THE INVENTION

The invention may be carried out in any one of several ways wherein the $TiO_2$ material with or without treatment with hydrous metal oxides, as the case may be, is first milled in a fluid energy mill with sufficient intensity to develop optimum pigmentary properties and thereafter coated with a dispersing agent by adding the latter to the milled pigment while the latter is being subjected to a light milling action designed to coat the individual particles of $TiO_2$ with the dispersing agent. In this connection the term "light milling action" as used herein will be understood to connote relatively severe turbulence but less than that required to effect any significant grinding or milling of the pigment.

A conventional fluid energy mill known to the trade as a steam micronizer may be used for effecting the objects of the invention by introducing the dispersing agent at a predetermined point along the mill radius between the outer ring, where the intense milling is effected, and the centrally located discharge point. However it is preferable to use a fluid energy mill of the tubular type in which both the milling and the coating with a dispersant are accomplished in two succeeding steps in one pass through the mill. The two-stage mill shown in FIG. 1 is designed for this purpose and is a modification of the tube mill described in copending application, Ser. No. 658,526 filed Aug. 4, 1967, now U.S. Pat. No. 3,514,043, and assigned to the assignee of the present application.

Referring to the drawing the tube mill, which is indicated generally at 10, is connected at its forward or entrance end 12 by a feed pipe 13 to a source of $TiO_2$ material 14 which is adapted to be fed into the entrance end of the mill at relatively high velocity by means of a venturi air or steam jet 15. The $TiO_2$ material makes one pass through the mill during which it is first subjected to an intense milling in the absence of a dispersing agent and then subjected to a light milling action in the presence of a dispersing agent after which the finished $TiO_2$ pigment is discharged from the exit end 16 of the mill into a suitable receiver (not shown) which may be a cyclone separator, electrostatic precipitator, a bag collector or the like.

As shown in FIG. 1 the fluid energy mill per se is shown as comprising two principal elements namely an inner tubular member 18 which serves as and is sometimes referred to hereinafter as the milling chamber; and an outer tubular member 19 which comprises the mill casing. The latter surrounds the inner tubular member in concentric relationship and is spaced circumferentially therefrom sufficiently to provide a plenum chamber therearound. Other elements of the mill include the two end plates 21 and 22 between which the concentric inner and outer tubular members are secured in the manner shown by means of a plurality of drawbolts 23. Suitable gaskets 24–24 are used between the ends of the respective tubular members 18 and 19 and the corresponding inner faces of the end plates 21 and 22 to insure fluidtight connections.

The exit end 16 of the milling chamber 18 is threaded externally so as to engage the screw threads of a centrally located aperture in the end plate 22. The opposite end or entrance end of the milling chamber merely abuts the adjacent gasket 24 and is securely held in sealing engagement therewith by screwing the inner tubular member 18 tightly thereagainst. Using this construction the milling chamber 18 may be readily removed from the assembled outer tubular member and end plates by simply unscrewing the milling chamber 18 therefrom— thus affording a simple, convenient and quick way of replacing a worn milling chamber; or substituting milling chambers of different materials of construction and/or different arrangements of jet apertures.

The entrance end of the milling chamber 18 is also provided with a deflector 25 in the form of a conical surface supported in the direct path of the entering $TiO_2$ material by means of a plurality of rods mounted in a retaining ring 26. The purpose of the deflector 25 is to deflect the $TiO_2$ material entering the milling chamber 18 toward the walls thereof where the material will be subjected most effectively to the high velocity milling fluid as described below.

Referring again to the plenum chamber the latter is provided with an imperforate partition 27 which divides the plenum chamber into two subchambers 28 and 29, respectively, the former surrounding the forward end of the milling tube and the latter the rear end thereof. The subchambers 28 and 29 are adapted to be supplied with milling fluids i.e. air or steam via feed pipes 30 and 31 respectively. The milling fluid may be fed into each subchamber at the same pressure and/or temperature or the pressure and temperature of the milling fluid in one subchamber may be higher or lower as the case may be, than that in the other. In any event the pressure and temperature of the milling fluid fed into subchamber 28 must be adequate to provide the necessary energy for intensely milling the $TiO_2$ material in this section of the milling tube.

To this end a plurality of jet apertures 32 are provided in the wall of the milling tube opposite the subchamber 28. As shown in FIG. 1 these jet apertures are arranged in circumferentially spaced relationship around the tube as for example at intervals of 45° or 60° to form rings of apertures around the tube, and are designed to inject high velocity streams of milling fluid into the milling section of the tube 18. The apertures 32 may have straight walls for producing fluid streams of subsonic and sonic velocities, or walls of the converging-diverging type for producing supersonic fluid velocities. Moreover, it has been found that by arranging the longitudinal axes of the jet apertures 32 at an acute angle to the longitudinal axis of the tube and in a direction opposed to the direction of flow of material through the mill both the retention time of the material in the milling zone and the turbulence of milling fluid are at a maximum thereby insuring a zone of high milling intensity. Further, the longitudinal axes of the jet apertures 32 are arranged tangential to a cylindrical surface coaxial with the milling chamber the diameter of the cylindrical surface being substantially equal to or smaller than the I.D. of the milling chamber 18 depending upon the particular angle of tangency desired. In the embodiment of the invention shown in FIG. 1 there are four rings of apertures around the milling chamber with successive rings of jet apertures spaced longitudinally along the milling chamber, but grouped together to form a milling zone A. The aforesaid angular jet apertures 32 are adapted to introduce a milling fluid i.e. air or steam as the case may be, at subsonic or sonic velocities from subchamber 28 into the milling zone A where the high velocity streams of fluid subject the incoming $TiO_2$ material to high intensity milling such that the large individual particles and/or aggregates are broken up into smaller sizes. Typical operating conditions are the introduction of the milling fluid into the milling chamber at a pressure of from 50 to 250 p.s.i.g., the fluid, if air is used, entering the milling zone A at a mass rate of flow ranging from 160 to 550 lbs./sec. ft.$^2$ at 20° C. and if steam, entering at a mass rate of flow ranging from 50 to 340 lbs./sec. ft.$^2$ at 260° C.

The subchamber 29 also supplies a milling fluid to the interior of the milling tube 18 and to this end the wall of the latter is provided with a plurality of jet apertures 33 opposite the subchamber 29. As shown in FIG. 1 these jet apertures are perpendicular to the longitudinal axis of the milling tube and arranged therearound as four rings of apertures defining zone B. As explained above the latter is not a milling zone but on the contrary a zone of mild milling action or turbulence and is affected by introducing the milling fluid into the subchamber 29 substantially perpendicularly to its longitudinal axis as a consequence of which retention time of the material in this section of the mill and the turbulence of the milling fluid are minimized. Thus while the $TiO_2$ material will be subjected to some turbulence in zone B the turbulence is insufficient to effect any significant milling. If air is used to produce the required turbulence it is introduced at a mass rate of flow ranging from 70 to 340 lbs./sec. ft.$^2$ at 20° C. while if steam is used its rate of flow may range from 40 to 210 lbs./sec. ft.$^2$ at 260° C.

At the same time the milled pigment is being subjected to the turbulent action of the milling fluid a dispersing agent is introduced into the turbulent zone B. To this end the wall of the milling tube 18 is provided with one or more perpendicular feed apertures at or adjacent the jet apertures 33. In the embodiment shown in FIG. 1 one feed aperture 34 is shown, identified as station No. 7, which is substantially midway of the four rings of jet apertures 33. This feed aperture 34 is adapted to be connected by feed pipe 35 to a tank 36 containing a dispersing agent. The numeral 37 indicates an adjustable rate pump or equivalent device in the feed pipe 35 for controlling the flow of dispersing agent from the tank 36 into turbulent zone B of the milling tube. The feed rate of the dispersant will depend upon the throughput of the $TiO_2$ and in the particular embodiment of the invention described herein may be in the range of from 0.005 to 2 gms. per minute. The dispersant may be in the form of a liquid, a finely divided solid or a vapor.

Locating feed aperture 34 at station No. 7, has been found to give optimum results but need not be strictly adhered to. It is essential however that the dispersing agent be introduced into the tubular chamber in the immediate vicinity of the turbulent zone B i.e. either between or immediately preceeding the jet apertures 33 but in no case following the jet apertures 33.

Since the tube mill of FIG. 1 employs a set of four rings of angular jet apertures directed against the inflowing $TiO_2$ material it is sometimes referred to, for brevity, as the reverse jet mill.

As shown in table I below when using the reverse jet mill of FIG. 1 the most satisfactory combination of optical properties and dispersion were obtained by introducing the dispersing agent at station No. 7 whereas when the dispersing agent was introduced at station No. 1 i.e. prior to the milling zone or at station No. 2 i.e. at the milling zone the finished pigment was inferior either as to optical properties or dispersion.

A modification of the reverse jet mill of FIG. 1 and more particularly of the milling tube per se is shown in FIG. 2. This modified milling tube 18' is adapted to be substituted for the tube 18 of the mill shown in FIG. 1 and distinguishes thereover in providing several more rings of jet apertures in the milling section of the tube. Thus a set of two rings of perpendicular apertures 38 is located between a set of two rings of angular jet apertures 39 in the direction of flow of the $TiO_2$ material through the mill and a set of four rings of angular jet apertures 40 in a direction opposed to the flow of $TiO_2$ through the mill. The latter jet apertures serve both to augment the milling action of the perpendicular jets and to pick up any large and/or unmilled particles of $TiO_2$ and return them countercurrently to the preceeding milling jets for further milling. The angular jets 39 augment the milling done by the jet streams 38 and 40 in that the jet streams 39 converge upon the jet streams 38 and 40 thereby creating maximum milling of the $TiO_2$ particles.

It is apparent that all three sets of jet aperture rings combine to form an intense milling zone A' in the forward end of the milling tube; and while three sets of jet aperture rings are employed in this embodiment of the invention it will be understood that the number of sets of jet aperture rings may be varied and that their sequence or order may be varied depending upon such factors as the intensity of milling required, the nature of the material being milled, variable fluid pressures for supplying the high velocity jet streams and similar factors.

The zone of mild milling action or turbulence is indicated at B' and is formed by providing a set of four rings of perpendicular jet apertures 33'. Moreover feed apertures 41, 42 and 43, corresponding to stations Nos. 4, 5, and 7, are provided in the wall of the tube for feeding a dispersing agent into the zone B'.

The following tests were used in determining the pigmentary and dispersion characteristics of a $TiO_2$ pigment made according to this invention.

TINCTORIAL STRENGTH TEST - TcS

The pigment is dispersed in an alkyd vehicle i.e. Aroplaz 1248 — ML–70 (Archer-Daniels, Midland, 700 Investors Building, Minneapolis 2, Minn.) on a 2:1 weight basis using a three roller mill. The resulting paste is then thoroughly mixed with a predispersed black colorant (Dutch Boy 990, National Lead Co., Perth Amboy, N.J.) and an opaque film of the tinted paint is drawn down on a cardboard chart and air-dried overnight. A standard pigment is similarly tested. The green, red and X-blue reflectance values of the tinted paint test chart and the standard test chart are determined by a Colormaster Differential Colorimeter manufactured by Manufacturers Engineering and Equipment Corp., Hatboro, Pa. The percent green reflectance of the standard test chart is then subtracted from that of the tinted paint chart and the tinctorial strength determined from a chart equating $d$ (green reflectance) with tinctorial strength.

SPECTRAL CHARACTERISTICS - SCx

The spectral characteristics of the pigment in a paint vehicle was determined by mixing the pigment with a soya alkyd vehicle containing carbon black and forming the mixture into a paste the ratio of pigment to carbon black in the paste being 5.0:0.06. This paste was then spread onto a lacquered sheet and the wet film was immediately tested in a Colormaster Differential Colorimeter manufactured by Manufacturers Engineering and Equipment Corp., Hatboro, Pa.

DISPERSION TEST

A 20 percent white alkyd paint is prepared by mixing 153.3 gms. of a composite vehicle comprising 113.2 g. Aroplaz 6008X–50 (Archer-Daniels-Midland Co., 733 3rd Avenue, New York 17, N.Y.) 40.07 g. Xylol (commercial grade-Shell Chemical Co.) and 0.1 g. Raybo 03 (Anti-Silking Agent, Raybo Chemical Co., Huntington, West Virginia) with 50 g. $TiO_2$ and 40 g. Ceramedia type 66 12—16 mesh. (The Quackenbush Co. P.O. Box 127, 1806 E. Northwest Highway, Arlington Heights, Ill.). The mixture is poured into an agitator and agitated at 9,000 r.p.m. for 3 minutes. A sample portion of the paint mixture is drawn down on a Hegman Gage. A visual evaluation is made immediately of the protruding coarse particles. The gage has readings from 0—8. The number nearest the fineness of grind boundary line on the gage is taken as the fineness of grind of the pigment. The higher the number the finer the pigment.

20° GLOSS TEST

A 20 percent white alkyd paint is prepared as described for the Dispersion Test above except that after agitating the paint mixture for 3 minutes an additional 100 gms. of Ceramedia is added and the mixing continued for another 9.0 minutes at about 8,500 r.p.m. The thoroughly mixed paint is then strained through a paper strainer and a sample tested for 20° gloss by drawing down a 0.001 inch film over black structural gloss and allowing the film to dry for 30 minutes. The 20° gloss measurements are made on the thin film using a three-angle gloss meter (Glossmeter Model J-3 Lockwood and McLorie Inc. Horsham, Pa.).

The following examples will serve to further illustrate the invention.

EXAMPLE I

A tubular fluid energy mill was used having a straight tubular milling chamber such as shown in FIG. 1 substantially 11.0 inches long, an inside diameter of about 1.0 inch and a wall thickness of about 0.25 inch. Starting about 3¾ inches from its entrance end a plurality of angular jet apertures 32 were arranged in the form of four separate rings of six jet apertures per ring each aperture spaced circumferentially 60° apart around the chamber with the individual rings of jet apertures spaced one-half inch apart along the length thereof. These jet apertures had their longitudinal axes at an acute angle of 45° to the longitudinal axis of the milling chamber and in a direction opposed to the flow of material therethrough—and were tangential to an inner cylinder of 0.75 inches in diameter. Starting at 7¾ inches from the entrance end of the milling tube were a plurality of perpendicular jet apertures 33 arranged in the form of four separate rings of six jet apertures per ring each aperture spaced circumferentially 60° apart around the tubular chamber with the individual rings of jet apertures spaced one-half inch apart along the length thereof. The perpendicular jet apertures were 0.035 inches in diameter and were tangential to an inner cylinder 0.75 inches in diameter.

The milling fluid used in this case was air which was introduced into the subchamber 28 at a pressure of 80 p.s.i.g., and issued from the several angular jet apertures 32 at a mass rate of flow of about 196 lbs./sec/ ft.$^2$. The air in subchamber 29 was at a pressure of 80 p.s.i.g. and issued from the several perpendicular jet apertures 33 at a mass rate of flow of about 196 lbs./sec. ft.$^2$.

The $TiO_2$ material in this instance was a calcined $TiO_2$ coated with about 1 percent titania, 2 percent alumina and 0.8 percent silica and was air borne into the entrance end of the milling chamber at the rate of 15 gms./min. where it was milled by the high velocity angular jets 32. The milled $TiO_2$ then traveled from the milling zone A to the turbulent zone B where it was subjected to a light milling action by the air jets 33 in the presence of a liquid organic dispersing agent which was fed into zone B via feed pipe 35 at station No. 7 at a rate of from 0.0375—0.1125 gms. per minute. The feed pipe was, in fact, a hypodermic needle equipped with an Aminco Motor Driven Compensator for effecting a constant rate of feed.

Using the controls set out above a series of runs were made using various organic dispersing agents and in varying amounts. The organic dispersing agents were those most commonly used in the art and included liquid and solid polyols i.e. low molecular weight polyglycol and trimethylolpropane (TMP), liquid polyphosphates, liquid hydroxy amines i.e. triethanolamine (TEA) and liquid and solid styrene-maleic anhydride copolymers.

The liquid polyols, polyphosphates and hydroxy amines were diluted to 200 g.p.l. with acetone to reduce viscosity. The styrene-maleic copolymer was used as a water solution diluted to 100 g.p.l. and the solid polyol was dissolved to 200 g.p.l. in methanol.

While the invention makes its most significant advance in the art when practiced with an organic dispersing agent such as those enumerated above it will be understood that inorganic dispersing agents i.e. sodium hexametaphosphate, the carbonates and hydroxides of alkali metals, alkali metal silicates, and the like, may be used and are contemplated within the scope of the invention as defined in the appended claims.

The results of these runs are shown in table I below. It will be seen immediately that the tinctorial strengths (TcS) of all pigments were 1,645 to as high as 1,660; the spectral characteristics (SCx) were 1.7 to as high as 2.0; 20° gloss values were at least 66 to as high as 72 while dispersion values were at least 3.5 to as high as 4.5 all of which are indicative of a finished pigment having excellent pigmentary properties plus excellent dispersion.

EXAMPLES II—IV

A series of additional experiments were run as controls to show the superiority of the process of this invention.

In example II the same tube mill was used as that shown in example I as were the operating conditions except however the various organic dispersing agents were added at station No. 1 i.e. before the TiO$_2$ material was milled. The data in table 1 clearly shows that the finished pigment had very low tinctorial strength (TcS as low as 1,475), very low spectral characteristics (SCx as low as 1.6) and low gloss values. Dispersion values were erratic varying from as high as 4.5 to as low as 2.0. The foregoing data support the discovery that the addition of an organic dispersing agent prior to milling seriously impairs pigmentary properties.

In example III the same operational control were used as in examples I and II except the organic dispersing agents were added at station No. 2 i.e. during milling. Again the data shows that pigmentary properties as well as dispersion values were much inferior to those of the pigment made according to example I.

In example IV the same controls were again used as in the preceeding examples except that the organic dispersing agents were added at station No. 10 i.e. beyond the turbulent zone B. The data from these runs confirms the discovery that by adding the organic dispersing agent after final milling the finished pigment will have good pigmentary properties but that when conventional techniques are used for adding the organic to the milled pigment i.e. by spraying or mechanical mixing the finished pigment will have only fair dispersion.

EXAMPLE V

Additional experiments were run using the modified milling tube shown in FIG. 2. This milling tube was substantially 11 inches long, had an I.D. of about 1 inch and wall thickness of about one-fourth inch. The two rings of angular jet apertures 39 started about 1¾ inches from the entrance end of the tube, each ring comprising six apertures each aperture having an I.D. of 0.035 inches and arranged 60° apart around the tube with their longitudinal axes tangential to an inner cylinder of ¾-inch diameter; and at an acute angle of 45° to the longitudinal axis of the tube and in the direction of flow therethrough. These rings were spaced one-half inch apart and followed by two rings of perpendicular apertures 38 of similar dimensions and similarly spaced around the milling tube. One-half inch from the two rings of perpendicular aperture 38 were four rings of angular apertures 40 similar in all respects to the angular jet apertures 39 but extending at an angle of 45° in a direction opposed to the flow of material through the tube. At approximately 2½ inches from the four angular rings of apertures 40 were four rings of perpendicular apertures 33' similar in all respects to the two rings of perpendicular apertures 38.

The milling fluid was air which issued from each set of jet apertures 38, 39 and 40 respectively at a mass rate of flow of about 196 lbs./sec. ft$^2$. The TiO$_2$ material was identical to that described in example I above and was fed into the milling tube at a rate of about 15 gms./min. The organic dispersing agents were fed to the feed apertures 41, 42 and 43 respectively at the rate of 0.0525 gms. per minute.

Using this milling tube a series of experiments were run wherein each of the organic dispersing agents was added within the turbulent zone B but at selected points therein. Thus one run was made at station No. 4 and one run at station No. 5, using styrene-maleic anhydride copolymer as the dispersing agent. Additional runs were made at station No. 5 using a low molecular weight polyglycol and a polyphosphate respectively.

It will be evident from the data tabulated in table II the finished pigments had both exceptionally good pigmentary properties and dispersions.

TABLE I.—REVERSE JET MILL, 4 TURBULENT JET RINGS

[Example I—Organic Additions at Turbulence]

| Organic, percent | Station No. | Optical properties | | | Dispersion, 3 min. grind |
|---|---|---|---|---|---|
| | | TcS | SCx | 20° gloss | |
| Low mol. wt. polyglycol, 0.50 | 7 | 1,660 | 1.8 | 69 | 3.5 |
| Polyphosphate, 0.25 | 7 | 1,660 | 2.0 | 71 | 3.5 |
| TEA, 0.25 | 7 | 1,660 | 1.8 | 66 | 4.0 |
| Styrene-maleic anhydride copolymer, 0.50 | 7 | 1,645 | 1.7 | 70 | 3.5 |
| TMP, 0.75 | 7 | 1,650 | 1.8 | 72 | 4.5 |

[Example II—Organic Additions Prior to Milling]

| Organic, percent | Station No. | Optical properties | | | Dispersion, 3 min. grind |
|---|---|---|---|---|---|
| | | TcS | SCx | 20° gloss | |
| Low mol. wt. polyglycol, 0.50 | 1 | 1,475 | 1.2 | 32 | 2 |
| TEA, 0.25 | 1 | 1,565 | 1.4 | 65 | 4 |
| Styrene-maleic anhydride copolymer, 0.75 | 1 | 1,595 | 1.4 | 67 | 4.5 |
| TMP, 0.50 | 1 | 1,500 | 1.1 | 37 | 2.5 |

[Example III—Organic Additions During Milling]

| Organic, percent | Station No. | Optical properties | | | Dispersion, 3 min. grind |
|---|---|---|---|---|---|
| | | TcS | SCx | 20° gloss | |
| Low mol. wt. polyglycol, 0.75 | 2 | 1,540 | 1.4 | 55 | 2 |
| Polyphosphate, 0.75 | 2 | 1,570 | 1.4 | 51 | 1.5 |
| TEA, 0.25 | 2 | 1,580 | 1.5 | 52 | 3.0 |
| Styrene-maleic anhydride copolymer, 0.25 | 2 | 1,545 | 1.3 | 55 | 2.5 |
| TMP, 0.75 | 2 | 1,565 | 1.4 | 53 | 1.0 |

[Example IV—Organic Additions at Exhaust]

| Organic, percent | Station No. | Optical properties | | | Dispersion, 3 min. grind |
|---|---|---|---|---|---|
| | | TcS | SCx | 20° gloss | |
| Low mol. wt. polyglycol, 0.50 | 10 | 1,640 | 1.9 | 70 | 3.5 |
| Polyphosphate, 0.50 | 10 | 1,640 | 1.8 | 69 | 3.0 |
| TEA, 0.25 | 10 | 1,615 | 1.8 | 75 | 3.5 |
| Styrene-maleic anhydride copolymer, 0.50 | 10 | 1,605 | 1.6 | 59 | 2.0 |

TABLE II—CONVERGING JET MILL, 4 TURBULENT JET RINGS

[Example V—Organic Additions at Turbulence]

| Organic, percent | Station No. | Optical properties | | | Dispersion, 3 min. grind |
|---|---|---|---|---|---|
| | | TcS | SCx | 20° gloss | |
| Styrene-maleic anhydride copolymer, 0.35 | 4 | 1,660 | 1.6 | 72 | 4 |
| | 5 | 1,645 | 1.6 | 72 | 4.5 |
| Low mol. wt. polyglycol, 0.35 | 5 | 1,645 | 1.6 | 75 | 4.5 |
| Polyphosphate, 0.35 | 5 | 1,635 | 1.4 | 74 | 4.5 |

From the accumulated data shown in tables I and II it is clear that in each instance wherein the pigment was made according to the novel process of this invention the finished pigments combined both excellent pigmentary properties and dispersion and were far superior to TiO$_2$ pigments made by conventional techniques.

The particular section of jet apertures both as to their diameter and the orientation of their longitudinal axes are not critical but are dependent on such factors as the size of the milling chamber, the available fluid pressure, and other considerations within the skill of the operator. Also while the present embodiment discloses jet apertures having straight walls for effecting subsonic and sonic velocities the invention also contemplates the use of jet apertures of the converging-diverging type for effecting supersonic velocities.

Moreover while the use of the partition 27 to divide the plenum chamber into two separate subchambers 28 and 29 is a preferred construction it is quite possible to operate the mill successfully without the partition—the milling of the $TiO_2$ in a milling zone A of the mill and the coating of the $TiO_2$ in the turbulent zone B being controlled by a judicious selection of jet apertures of the proper size and number.

While this invention has been described and illustrated by the examples shown, it is not intended to be strictly limited thereto and other variations and modifications may be employed within the scope of the following claims.

I claim:

1. In a method for producing $TiO_2$ pigment wherein $TiO_2$ pigmentary material is milled and treated with a dispersing agent the improvement comprising: feeding the $TiO_2$ pigmentary material into a tubular fluid energy mill having a zone of high milling intensity succeeded by a zone of light milling action, introducing a milling fluid into the zone of high milling intensity at an acute angle to the longitudinal axis of said mill and at a mass rate of flow of from 50 to 550 lbs./sec. ft.$^2$, introducing a milling fluid into said zone of light milling action at an angle substantially perpendicular to the longitudinal axis of said mill and at a mass rate of flow of from 40 to 340 lbs./sec. ft.$^2$, milling the $TiO_2$ material in said zone of high milling intensity to produce a milled pigment of optimum pigmentary properties, introducing said dispersing agent into said mill at a point succeeding said zone of high milling intensity but not beyond said zone of light milling action and subjecting the milled $TiO_2$ material to sufficient turbulence in said zone of light milling action and in the presence of said dispersing agent to coat the individual pigment particles with said dispersing agent.

2. In a method for producing a $TiO_2$ pigment according to the improvement of claim 1 wherein said dispersing agent is introduced into said mill at a point intermediate said zone of high milling intensity and said zone of relatively light milling action.

3. In a method for producing a $TiO_2$ pigment according to the improvement of claim 1 wherein said dispersing agent is introduced into said mill at said zone of relatively light milling action.

4. In a method for producing a $TiO_2$ pigment according to the improvement of claim 1 wherein said milling fluid is selected from the group consisting of air and steam.

5. Process for producing $TiO_2$ pigment combining both superior pigmentary properties and dispersion in coating compositions comprising the steps of: feeding $TiO_2$ material in a single pass through a tubular fluid energy mill, introducing a milling fluid into the forward end of said mill at an acute angle of from 40°—60° to the longitudinal axis thereof to provide a zone of high milling intensity in the forward end of said mill, introducing a milling fluid into said mill at a point rearwardly of said zone of high milling intensity and substantially perpendicular to the longitudinal axis of said mill to provide a zone of relatively light milling action immediately succeeding said zone of high milling intensity, milling said $TiO_2$ material in said zone of high milling intensity to produce a milled pigment of optimum pigmentary properties, introducing an organic dispersing agent into said mill at a point succeeding said zone of high milling intensity but not beyond said zone of relatively light milling action and in the presence of said organic dispersing agent subjecting said mill pigment to light milling action in the presence of said organic dispersing agent to coat the individual pigment particles uniformly with said dispersing agent.

6. Process for producing $TiO_2$ pigment combining both superior pigmentary properties and dispersion according to claim 5 wherein said milling fluid enters said zone of high milling intensity and said zone of relatively light milling action respectively via two separate feed lines.

7. Process for producing $TiO_2$ material combining both superior pigmentary properties and dispersion according to claim 6 wherein the milling fluid is introduced into said milling zone at a mass rate of flow in the range of from 50 to 550 lbs./sec. ft$^2$ and into said zone of light milling action at a mass rate of flow of from 40 to 340 lbs./sec. ft.$^2$.

8. Process for producing $TiO_2$ pigment combining both superior pigmentary properties and dispersion according to claim 5 wherein the milling fluid is introduced into said zone of high milling intensity and said zone of relatively light milling action respectively as a plurality of jet streams circumscribing said zones and tangentially oriented with respect to said tubular mill.

9. Process for producing $TiO_2$ pigment combining both superior pigmentary properties and dispersion according to claim 5 wherein said milling fluid is selected from the group consisting of air and steam and said organic dispersing agent is selected from the group consisting of low molecular weight polyglycol, trimethylolpropane, polyphosphate, triethanolamine and solid and liquid styrene-maleic anhydride.

10. In a tubular fluid energy mill comprising a substantially straight tubular milling chamber having a plurality of jet apertures in the walls thereof for injecting a milling fluid into said milling chamber the improvement comprising: a plurality of jet apertures arranged in the forward section of said chamber, in predetermined spaced relationship therealong and at an acute angle to the longitudinal axis thereof to provide a zone of high milling intensity therein adjacent the entrance end of said milling chamber, and a plurality of jet apertures arranged rearwardly of said zone of high milling intensity, in predetermined spaced relationship therealong, and at substantially right angles to the longitudinal axis thereof to provide a zone of relatively light milling action adjacent the exit end of said milling chamber, and constricting feed apertures in the wall of said mill opposite said zone of light milling action for introducing a dispersing agent therein.